(12) United States Patent
Hasegawa

(10) Patent No.: US 9,002,560 B2
(45) Date of Patent: Apr. 7, 2015

(54) CONTROL DEVICE OF A VEHICLE

(75) Inventor: Koichi Hasegawa, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/980,366

(22) PCT Filed: May 30, 2011

(86) PCT No.: PCT/JP2011/062382
§ 371 (c)(1),
(2), (4) Date: Jul. 18, 2013

(87) PCT Pub. No.: WO2012/164662
PCT Pub. Date: Dec. 6, 2012

(65) Prior Publication Data
US 2013/0297133 A1    Nov. 7, 2013

(51) Int. Cl.
| | | |
|---|---|---|
| B60W 20/00 | (2006.01) | |
| B60K 1/02 | (2006.01) | |
| B60K 17/35 | (2006.01) | |
| B60K 6/445 | (2007.10) | |
| B60W 10/06 | (2006.01) | |
| B60W 10/14 | (2012.01) | |
| B60W 30/192 | (2012.01) | |
| B60K 23/08 | (2006.01) | |

(52) U.S. Cl.
CPC ........ B60W 20/00 (2013.01); *B60K 2023/0833* (2013.01); B60K 1/02 (2013.01); B60K 17/35 (2013.01); B60K 23/0808 (2013.01); *B60K 2023/0858* (2013.01); B60K 6/445 (2013.01); B60W 10/06 (2013.01); B60W 10/14 (2013.01); B60W 30/192 (2013.01); *Y10S 903/903* (2013.01); *Y02T 10/6239* (2013.01); *Y02T 10/6265* (2013.01)

(58) Field of Classification Search
USPC ........................................................... 701/22
See application file for complete search history.

(56) References Cited

U.S. PATENT DOCUMENTS

| | | | |
|---|---|---|---|
| 7,497,285 B1 * | 3/2009 | Radev ...................... | 180/65.225 |
| 2001/0027369 A1 | 10/2001 | Nishida et al. | |
| 2008/0120011 A1 * | 5/2008 | Iwase et al. ................... | 701/102 |

FOREIGN PATENT DOCUMENTS

| | | |
|---|---|---|
| JP | 61-033324 A | 2/1986 |
| JP | 2001-071776 A | 3/2001 |
| JP | 2001-277882 A | 10/2001 |
| JP | 2004-090708 A | 3/2004 |
| JP | 2005-054858 A | 3/2005 |
| JP | 2005-145094 A | 6/2005 |
| JP | 2010-111194 A | 5/2010 |
| JP | 2010-254135 A | 11/2010 |

* cited by examiner

*Primary Examiner* — Mary Cheung
*Assistant Examiner* — Anne Mazzara
(74) *Attorney, Agent, or Firm* — Sughrue Mion, PLLC

(57) ABSTRACT

In a hybrid vehicle that is in a four-wheel drive system based on FF layout and that is switchable between a two-wheel drive state and a four-wheel drive state by an electronically controlled coupling 10, the electronically controlled coupling 10 is controlled to a release side when an engine 1 is started in an EV-4WD travel state so as to reduce the transmission amount of engine torque to a drive system of a side of rear wheels 8L and 8R.

6 Claims, 8 Drawing Sheets

CONTROL DEVICE OF A VEHICLE

CROSS REFERENCE TO RELATED APPLICATIONS

This application is a National Stage of International Application No. PCT/JP2011/062382 filed May 30, 2011, the contents of all of which are incorporated herein by reference in their entirety.

TECHNICAL FIELD

The present invention relates to a control device of a vehicle that includes a torque distributor capable of changing a distribution ratio of torque to a main drive wheel (for example, a front wheel) and a driven wheel (for example, a rear wheel).

RELATED ART

Known vehicles equipped with torque sources such as engines include vehicles provided with torque distributors (for example, electronically controlled couplings), which are capable of changing the distribution ratio of torque to the front and rear wheels, making those vehicles capable of switching between a two-wheel drive state, in which the vehicle is driven either on the front wheels or the rear wheels, and a four-wheel drive state, in which the vehicle is driven on both the front wheels and the rear wheels (see, for example, patent document 1 and patent document 2 below).

Those vehicles provided with torque distributors are capable of being selectively controlled, depending on the vehicles' travel state, in the four-wheel drive state or in controlled torque distribution to the front wheels and the rear wheels (including the two-wheel drive state, in which torque is distributed only to the front wheels or the rear wheels), and this improves the travel performance of the vehicles. This, additionally, improves the fuel efficiency (fuel consumption ratio) as compared with continuous travel in the four-wheel drive state.

RELATED ART DOCUMENTS

Patent Documents

[Patent Document 1] Japanese Unexamined Patent Application Publication No. 2005-145094.
[Patent Document 2] Japanese Unexamined Patent Application Publication No. 2010-254135.

SUMMARY OF THE INVENTION

Problems to be Solved by the Invention

Unfortunately, the above-described vehicles switchable by the torque distributors between the two-wheel drive state and the four-wheel drive state may encounter the following problems when the torque distributor is in fastened state, that is, when the engine is started in the four-wheel drive state.

The vehicles switchable by the torque distributor between the two-wheel drive state and the four-wheel drive state include vehicles in a four-wheel drive system based on FF (front engine, front-wheel-drive) layout and vehicles in a four-wheel drive system based on FR (front-engine, rear-wheel-drive) layout. Other such vehicles include conventional vehicles equipped with engine alone as torque source and hybrid vehicles equipped with engine and motor as torque source. The following description will take, as an example, a hybrid vehicle employing a standby four-wheel drive system based on FF layout.

In this kind of hybrid vehicle, assume that the torque distributor is in fastened state and the travel is by the motor alone (hereinafter occasionally referred to as "EV-4WD travel"). In this state, when the engine is started due to an increase in demanded torque, which can be caused by, for example, an increase in the depression degree of the accelerator pedal by the driver (an increase in the accelerator opening degree), the engine torque at this engine start time is transmitted to the drive system (drive line) on the side of the rear wheels through the torque distributor in fastened state. Here, in a situation where the number of engine revolutions is comparatively low (for example, during the time from cranking to complete explosion), the variable frequency of the torque transmitted toward the drive system on the side of the rear wheels and the characteristic frequency of drive system on the side of the rear wheels occasionally agree. In this situation, vibration can occur due to a resonance phenomenon in the drive system on the side of the rear wheels. In vibration-occurring situations, the vibration propagates to the vehicle body, causing noise (muffled sound) in the vehicle interior.

Such situation is attributed to the promoted reductions in size and weight of the differential gear on the side of the rear wheels of the above-described hybrid vehicles in the standby four-wheel drive system based on FF layout. This has made the rigidity at the mount portion of the drive system on the side of the rear wheels comparatively low, and made the characteristic frequency of the drive system on the side of the rear wheels a comparatively low frequency band.

The present invention has been made in view of this respect, and it is an object of the present invention to provide a control device that is for a vehicle capable of changing a distribution ratio of torque to the main drive wheel and the driven wheels by the torque distributor, and that inhibits occurrence of vibration at the start time of the engine.

Means of Solving the Problems

—Summary of the Invention—

As a summary of the present invention implemented to realize the object, at the time of start of the internal combustion engine with the torque distributor in fastened state, the engagement force of the torque distributor is lowered so as to reduce the transmission amount of the torque (variable torque) of the internal combustion engine to the driven wheel side, thus realizing a state in which a change in the torque of the internal combustion engine is difficult to transmit to the driven wheel side. This inhibits occurrence of vibration on the driven wheel side due to transmission of a change in torque.

—Means of Realizing the Object—

Specifically, the present invention is based on a control device of a hybrid vehicle that includes an internal combustion engine and a motor as travel-purpose torque sources, and a torque distributor configured to change a distribution ratio of torque from the travel-purpose torque sources to main driving wheels and driven wheels so as to render variable a transmission amount of the torque to a side of the driven wheels. The control device of a vehicle includes torque transmission amount controlling means for controlling the torque distributor to reduce the transmission amount of the torque to the side of the driven wheels when the internal combustion engine is started in such a travel state that the torque from the motor alone is used as travel-purpose torque and that the torque is distributed by the torque distributor to the main driving wheels and the driven wheels.

As used herein, to "reduce the transmission amount of the torque to the side of the driven wheels" is a concept that encompasses both cases of releasing the torque distributor (where the transmission amount of torque to the side of the driven wheels is made "0") and slipping the torque distributor (where the transmission amount of torque to the side of the driven wheels is reduced while being kept larger than "0").

For example, when the internal combustion engine is started in such a state that the torque is distributed by the torque distributor to the main driving wheels and the driven wheels, and when the frequency of torque change at the engine start time of the internal combustion engine and the characteristic frequency of the drive system on the side of the driven wheels agree, then there is a possibility of vibration occurring at the drive system on the side of the driven wheels due to a resonance phenomenon. In view of this, at the engine start time of the internal combustion engine, the torque distributor is controlled to reduce the transmission amount of torque to the side of the driven wheels so as to make difficult the transmission of torque change to the drive system on the side of the driven wheels. This inhibits vibration at the drive system on the side of the driven wheels and inhibits noise (muffled sound) in the vehicle interior caused by the vibration.

Additionally, assume that the internal combustion engine is started due to, for example, an increase in load during EV-4WD travel (that is, travel with the torque from the motor alone used as the travel-purpose torque and with the torque distributor distributing the torque to the main driving wheels and driven wheels), such as during travel on a low μ road in a light load state. In this case, the transmission amount of torque to the side of the driven wheels by the torque distributor is reduced. This eliminates such situations that during travel of the vehicle, vibration and noise occur at the drive system on the side of the driven wheels. In particular, this kind of vehicle (hybrid vehicle) has such characteristics during EV travel as low frequency of vibration at the drive system and a high level of silence. In this respect, if vibration or noise occurs during EV travel, the driver and the passenger may feel uncomfortable. The present invention eliminates such situation and improves product quality of a hybrid vehicle capable of four-wheel drive travel.

The period for controlling the torque distributor to reduce the transmission amount of the torque to the side of the driven wheels is set only between a start demand time of the internal combustion engine and a time when the internal combustion engine reaches a number of revolutions at which the internal combustion engine is self-sustainable.

This ensures that in vibration-free state (a state in which the internal combustion engine reaches a number of revolutions at which the internal combustion engine is self-sustainable), the transmission amount of torque to the side of the driven wheels is increased, thereby ensuring a travel performance of the vehicle suitable for the road surface condition or other condition.

As a specific operation to reduce the transmission amount of the torque to the side of the driven wheels, the torque distributor is controlled to match an actual rotation number difference with a target rotation number difference set in advance, the actual rotation number difference being a rotation difference between an actual number of rotations of the main driving wheels and an actual number of rotations of the driven wheels.

More specifically, the transmission amount of the torque to the side of the driven wheels at the start time of the internal combustion engine has a target value set at a largest value in a range in which a vibration at the side of the driven wheels due to a change in the torque generated by the internal combustion engine is inhibited.

This ensures as large a transmission amount of the torque as possible to the side of the driven wheels while inhibiting vibration at the drive system on the side of the driven wheels, thereby maintaining the travel performance of the vehicle.

Further, when an amount of heat generation at the torque distributor exceeds an upper limit value of a tolerance amount of heat generation set in advance, the target value of the transmission amount of the torque to the side of the driven wheels is limited to a value that does not exceed the upper limit value of the tolerance amount of heat generation.

This inhibits occurrence of vibration at the drive system on the side of the driven wheels while preventing overheating of the torque distributor.

A specific drive system of the vehicle is a standby four-wheel drive system based on front engine, front-wheel-drive layout.

Effects of the Invention

In the present invention, at the start time of the internal combustion engine, the torque distributor is controlled to reduce the transmission amount of torque to the side of the driven wheels. This inhibits occurrence of vibration at the side of the driven wheels.

MODES FOR CARRYING OUT THE INVENTION

Embodiments of the present invention will be described below by referring to the accompanying drawings.

Embodiment 1

Figure 1:
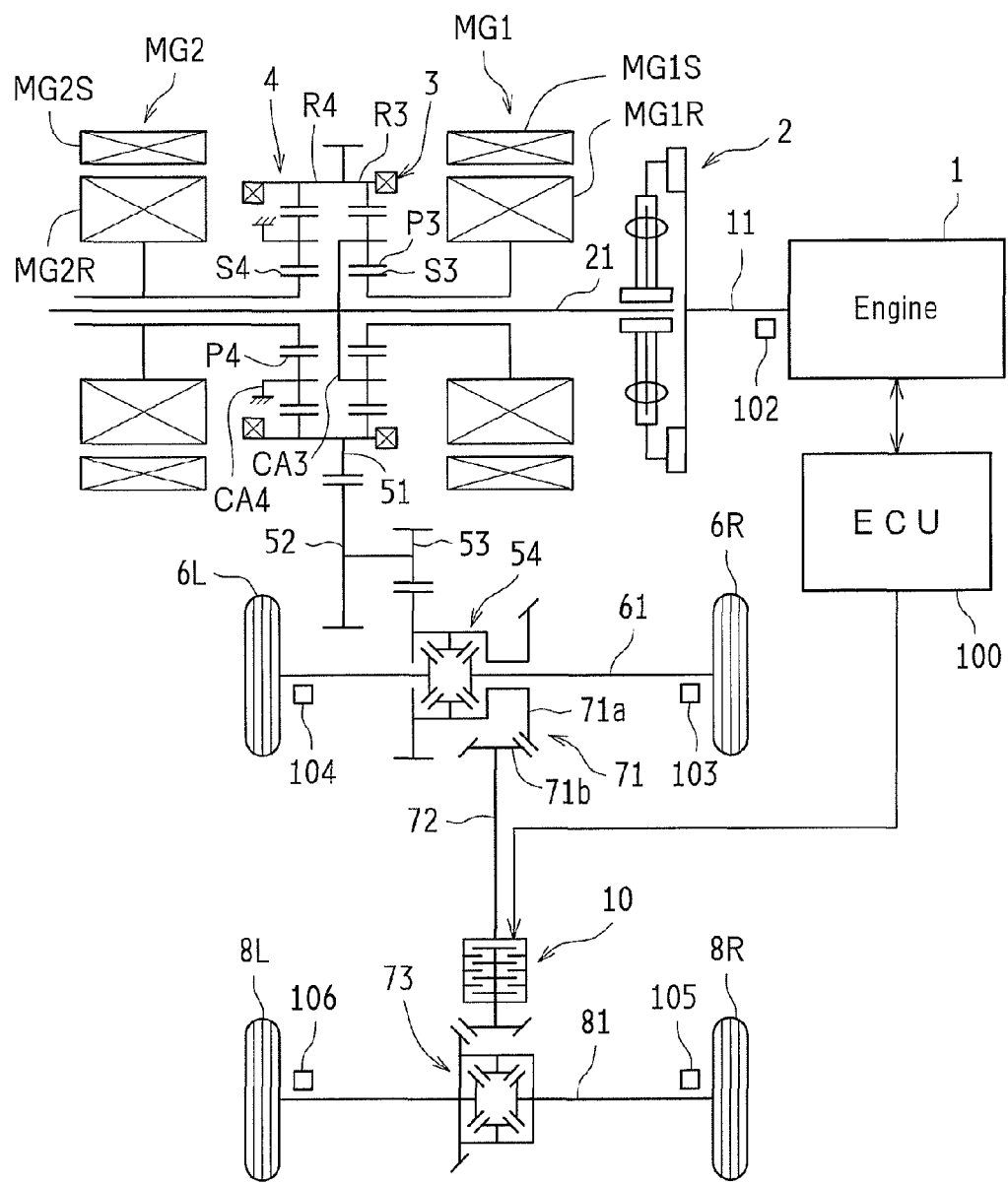
FIG. 1 is a diagram schematically illustrating a configuration of a vehicle according to embodiment 1.

FIG. 1 is a diagram schematically illustrating an exemplary vehicle according to the present invention.

The vehicle in this example is a hybrid vehicle employing a standby four-wheel drive system in FF (front engine, front-wheel-drive) layout, and includes an engine (internal combustion engine) 1 that generates vehicle travel-purpose torque, a first motor generator MG1 that mainly functions as an electric generator, a second motor generator MG2 that mainly functions as a motor, a power split mechanism 3, a reduction mechanism 4, a counter drive gear 51, a counter driven gear 52, a final gear 53, a front wheel-purpose differential device 54, a front-wheel shaft (drive shaft) 61, front wheels (main drive wheels) 6L and 6R, a transfer 71, a propeller shaft 72, an electronically controlled coupling (torque distributor, disconnect mechanism) 10, a rear wheel-purpose differential device 73, a rear-wheel shaft (drive shaft) 81, rear wheels (driven wheels) 8L and 8R, and an ECU (Electronic Control Unit) 100. The control device of a vehicle according to the present invention is implemented by a program executed by the ECU 100.

The ECU 100 is made up of, for example, an HV (hybrid) ECU, an engine ECU, and a battery ECU, and these ECUs are communicatively coupled to each other.

Next, description will be made with regard to the elements including the engine 1, the motor generators MG1 and MG2, the power split mechanism 3, the reduction mechanism 4, the transfer 71, the electronically controlled coupling 10, and the ECU 100.

—Engine—

The engine 1 is a known power unit that combusts fuel such as gasoline engine and diesel engine to output power, and is configured to control driving states such as the throttle opening degree (air intake amount) of a throttle valve (not shown) disposed along an intake conduit, the fuel injection amount, and the ignition timing. The output of the engine 1 is transmitted to an input shaft 21 through a crank shaft 11 and a damper 2. The damper 2 is, for example, a coil-spring transaxle damper that absorbs a change in torque in the engine 1.

—Motor Generator—

The first motor generator MG1 is an alternating current synchronous generator that includes a rotor MG1R made of a permanent magnet rotatably supported relative to the input shaft 21, and a stator MG1S around which three-phase winding coils are wound. Thus, the first motor generator MG1 functions as a generator and a motor (electric motor). Likewise, the second motor generator MG2 is an alternating current synchronous generator that includes a rotor MG2R made of a permanent magnet rotatably supported relative to the input shaft 21, and a stator MG2S around which three-phase winding coils are wound. Thus, the second motor generator MG2 functions as a motor (electric motor) and a generator.

Figure 2:
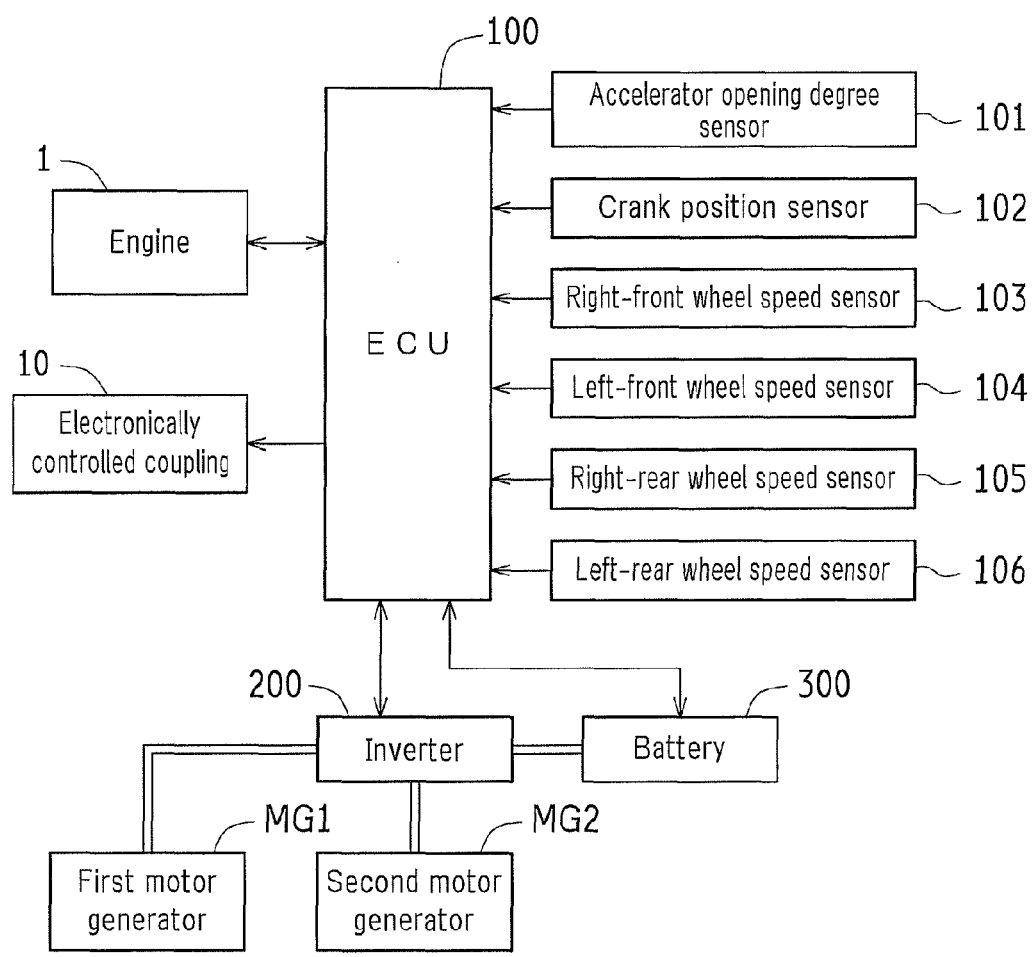
FIG. 2 is a block diagram schematically illustrating a configuration of a control system of the vehicle shown in FIG. 1.

As shown in FIG. 2, the first motor generator MG1 and the second motor generator MG2 are each coupled to a battery (storage device) 300 through an inverter 200. The inverter 200 is controlled by the ECU 100, and by controlling the inverter 200, regeneration or powering (assist) of each of the motor generators MG1 and MG2 is set. The regeneration power in this case is charged in the battery 300 through the inverter 200. The driving-use electric power for the motor generators MG1 and MG2 is supplied from the battery 300 through the inverter 200.

—Power Split Mechanism—

As shown in FIG. 1, the power split mechanism 3 is a planetary gear mechanism made up of: a sun gear S3, which is an external-tooth gear that rotates itself in the center of a plurality of gear elements; a pinion gear P3, which is an external-tooth gear that rotates itself and revolves around the circumference of the sun gear S3 while being in external contact therewith; a ring gear R3, which is a hollow internal-tooth gear to mesh with the pinion gear P3; and a planetary carrier CA3, which supports the pinion gear P3 and rotates about the planetary carrier CA3 through the revolution of the pinion gear P3. The planetary carrier CA3 is integrally rotatably coupled to the input shaft 21 on the engine 1 side. The sun gear S3 is integrally rotatably coupled to the rotor MG1R of the first motor generator MG1.

The power split mechanism 3 transmits the torque of at least one of the engine 1 and the second motor generator MG2 to the left and right front wheels 6L and 6R through the counter drive gear 51, the counter driven gear 52, the final gear 53, the front wheel-purpose differential device 54, and a front-wheel shaft 61.

—Reduction Mechanism—

The reduction mechanism 4 is a planetary gear mechanism made up of: a sun gear S4, which is an external-tooth gear that rotates itself in the center of a plurality of gear elements; a pinion gear P4, which is an external-tooth gear that is rotatably supported by a carrier (transaxle case) CA4 and rotates about the pinion gear P4 while being in external contact therewith; and a ring gear R4, which is a hollow internal-tooth gear to mesh with the pinion gear P4. The ring gear R4 of the reduction mechanism 4, the ring gear R3 of the power split mechanism 3, and the counter drive gear 51 are integral with each other. The sun gear S4 is integrally rotatably coupled to the rotor MG2R of the second motor generator MG2.

The reduction mechanism 4 decelerates the torque of at least one of the engine 1 and the second motor generator MG2 at a convenient deceleration ratio. The decelerated torque is transmitted to the left and right front wheels 6L and 6R through the counter drive gear 51, the counter driven gear 52, the final gear 53, the front wheel-purpose differential device 54, and the front-wheel shaft 61.

—Transfer and Other Elements—

The transfer 71 includes a drive gear 71a integrally rotatably coupled to the front wheel-purpose differential device 54, and a driven gear 71b to mesh with the drive gear 71a. The driven gear 71b is integrally rotatably coupled with the propeller shaft 72. The propeller shaft 72 is coupled to the left and right rear wheels 8L and 8R through the electronically controlled coupling 10, the rear wheel-purpose differential device 73, and the rear-wheel shaft 81. Torque transmitted to the transfer 71 from the front wheel-purpose differential device 54 is transmitted to the propeller shaft 72 and the electronically controlled coupling 10. When the electronically controlled coupling 10 is in fastened state (coupling torque transmission state), the torque is transmitted (divided) to the left and right rear wheels 8L and 8R through the rear wheel-purpose differential device 73 and the rear-wheel shaft 81.

—Electronically Controlled Coupling—

The electronically controlled coupling 10 is of a pilot clutch system and includes, for example, a main clutch made up of a multi-disc friction clutch, a pilot clutch (electromagnetic multi-disc clutch), a cam mechanism, and an electromagnet. The electromagnetic force of the electromagnet turns the pilot clutch into engagement, and the cam mechanism transmits the engagement force to the main clutch, thereby turning the main clutch into engagement (for a specific configuration, see, for example, Japanese Unexamined Patent Application Publication No. 2010-254135).

In the electronically controlled coupling 10 in this example, an exciting current $I_e$ supplied to the electromagnet is controlled to control torque capacity, that is, a coupling torque $T_c$. This ensures that the torque distribution ratio of the side of the rear wheels 8L and 8R to the total torque is adjusted in a non-step manner in the range of, for example, 0 to 0.5. The exciting current $I_e$, which is for the electromagnet of the electronically controlled coupling 10, is controlled by the ECU 100.

Figure 3:
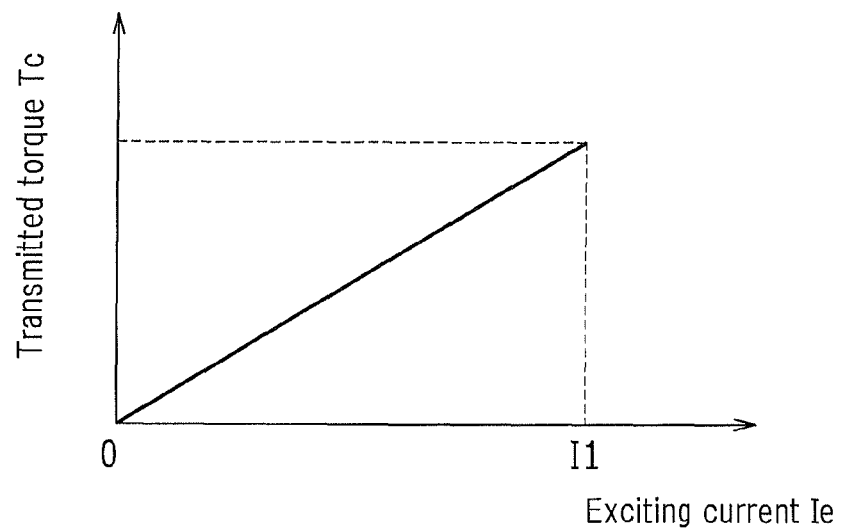
FIG. 3 is a graph illustrating a relationship between an exciting current to an electronically controlled coupling and a transmitted torque of the electronically controlled coupling.

FIG. 3 illustrates a relationship between the exciting current $I_e$ to the electromagnet of the electronically controlled coupling 10 and the transmitted torque (coupling torque) $T_c$ of the electronically controlled coupling 10. Thus, the transmitted torque $T_c$ of the electronically controlled coupling 10 can be variably controlled in accordance with the exciting current $I_e$, which is an actuator operation amount.

For example, when the exciting current $I_e$ to the electronically controlled coupling 10 is "0", the main clutch is in non-engaged (released) state and the transmitted torque $T_c$ is "0%", realizing a travel state equivalent to the front-wheel drive state (two-wheel drive state on the front-wheel driving). When the exciting current $I_e$ to the electronically controlled coupling 10 increases, the transmitted torque $T_c$ increases. At an exciting current $I_e$ of I1 as shown in the drawing, the transmitted torque $T_c$ is "100%", that is, the torque distribution of the rear wheels 8L and 8R is at its maximum, realizing a travel state equivalent to the direct-connection four-wheel drive state. Thus, in accordance with the exciting current $I_e$ to the electronically controlled coupling 10, the torque distribution between the front and rear wheels can be variably controlled.

—ECU—

The ECU 100 is an electronic control device that executes various kinds of control including driving control of the engine 1 and cooperative control of the engine 1 and the motor generators MG1 and MG2, and includes a CPU (Central Processing Unit), a ROM (Read Only Memory), a RAM (Random Access Memory), and a back-up RAM.

The ROM stores various control programs, a map to refer to when these various control programs are executed, and the like. The CPU executes arithmetic operations based on the various control programs and the map stored in the ROM. The RAM is a memory that temporarily stores results of arithmetic operations executed at the CPU, data input from various sensors, and the like. The back-up RAM is a nonvolatile memory that stores data and the like to be stored at the off time of an ignition switch, not shown.

As shown in FIG. 2, the ECU 100 is coupled with an accelerator opening degree sensor 101 that detects an accelerator opening degree $A_{cc}$, which indicates the depression degree of the accelerator pedal, a crank position sensor 102 that outputs a pulse signal every time the crank shaft 11 rotates by a predetermined angle, a right-front wheel speed sensor 103 that detects the rotation speed (rotation number) of the right-front wheel 6R, a left-front wheel speed sensor 104 that detects the rotation speed of the left-front wheel 6L, a right-rear wheel speed sensor 105 that detects the rotation speed of the right-rear wheel 8R, a left-rear wheel speed sensor 106 that detects the rotation speed of the left-rear wheel 8L, and the like. The ECU 100 is coupled with other sensors including a steering angle sensor that detects a steering angle delta of the handle, a brake pedal sensor that detects on/off of the brake pedal, a water temperature sensor that detects the temperature of engine cooling water, a throttle opening degree sensor that detects the opening degree of a throttle valve disposed at the intake conduit, an air flow meter that detects the amount of air intake, a current sensor that detects the charge-discharge current of the battery 300, and a battery temperature sensor. Signals from these sensors are input into the ECU 100.

Based on the output signals of the above-described various sensors, the ECU 100 executes various kinds of control associated with the engine 1 including throttle opening degree control (air intake amount control) of the engine 1, fuel injection amount control, and ignition timing control. The ECU 100 also executes control of the electronically controlled coupling 10 including "coupling transmitted-torque control", described later.

Further, in order to keep the battery 300 under control, the ECU 100 calculates the state of charge (SOC: State of Charge) of the battery 300, an input limitation $W_{in}$ and an output limitation $W_{out}$ of the battery 300, and the like based on the integrated value of the charge-discharge current detected at the current sensor, the battery temperature detected at the battery temperature sensor, and the like.

The ECU 100 is also coupled with the inverter 200. The inverter 200 includes IPMs (Intelligent Power Modules) for control of the respective motor generators MG1 and MG2. The IPMs are each made up of a plurality of (for example, six) semiconductor switching elements (for example, IGBT (Insulated Gate Bipolar Transistor)) and the like.

For example, in accordance with a command signal from the ECU 100, the inverter 200 converts DC current from the battery 300 into current to drive the motor generators MG1 and MG2, while at the same time converting AC current generated at the first motor generator MG1 by the power of the engine 1 and AC current generated at the second motor generator MG2 by the regeneration brake into DC current to charge the battery 300. In accordance with the travel state, the inverter 200 also supplies, as driving-purpose electric power, AC current generated at the first motor generator MG1 to the second motor generator MG2.

—Travel Mode—

In situations of bad driving efficiency of the engine 1 such as at the start time and during low-speed travel, the hybrid vehicle according to this embodiment travels on the second motor generator MG2 alone (hereinafter occasionally referred to as "EV travel"). The EV travel also takes place when the driver selects the EV travel mode using a travel mode selection switch disposed in the vehicle interior.

During normal travel, the power split mechanism 3, for example, splits the power of the engine 1 into two paths, one for direct driving (driving by direct torque) of the driving wheels (which are the front wheels 6L and 6R in two-wheel drive state, and the front wheels 6L and 6R and the rear wheels 8L and 8R in four-wheel drive state), and the other for driving the first motor generator MG1 to generate power. Here, the second motor generator MG2 is driven by the generated electric power to aid the driving of the driving wheels (driving by electrical path).

During high speed travel, the power from the battery (travel-purpose battery) 300 is further supplied to the second motor generator MG2 to increase the output of the second motor generator MG2, thereby adding (torque assist; powering) to the torque of the driving wheels.

Furthermore, at the time of deceleration, the second motor generator MG2 functions as an electric generator to execute regeneration power generation and store the collected electric power in the battery 300. When the charge amount of the battery 300 reduces and there is a particular need for charging, the output of the engine 1 is increased to increase the amount of power generation of the first motor generator MG1, thereby increasing the charge amount of the battery 300. The control of increasing the driving amount of the engine 1 is executed, of course, during low-speed travel where necessary. Examples include when the battery 300 needs charging as described above, when an auxiliary machine such as an air conditioner is driven, when the temperature of the cooling water of the engine 1 is raised to a predetermined temperature, and when the vehicle is suddenly accelerated.

Further, in the hybrid vehicle, the engine 1 is stopped depending on the driving state of the vehicle and the state of the battery 300 so as to improve the fuel efficiency. The driving state of the vehicle and the state of the battery 300 are further detected thereafter to re-start the engine 1. Thus, in the hybrid vehicle, the engine 1 is driven intermittently even when the ignition switch is at the on position.

Figure 4:
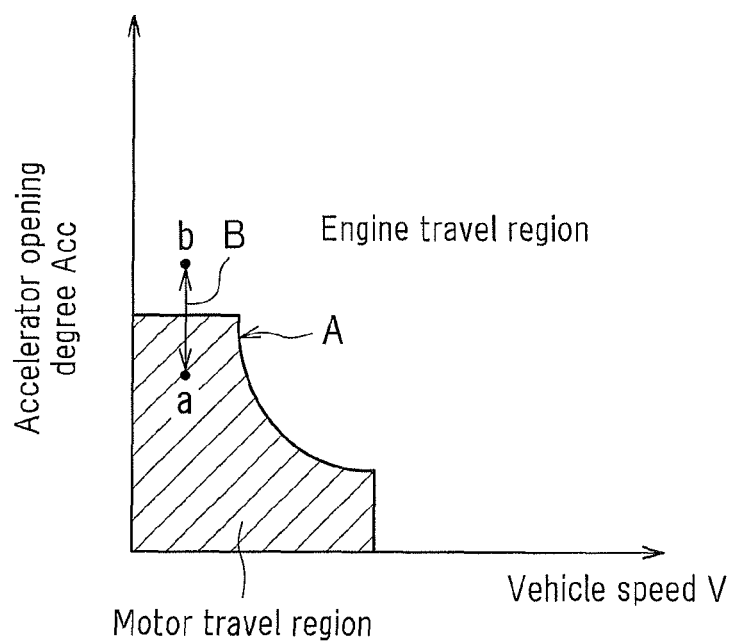
FIG. 4 is a diagram illustrating a torque selecting map for switching between motor travel and engine travel in accordance with the vehicle speed and the accelerator opening degree.

Next, switching of the travel mode will be described. FIG. 4 illustrates a torque selecting map with which to, in accordance with a vehicle speed V and the accelerator opening degree $A_{cc}$, switch between motor travel (EV travel) and engine travel (including both travel by the torque of the engine 1 alone and travel by the torque of the engine 1 and the second motor generator MG2). The solid line A shown in FIG. 4 is a boundary line between the engine travel region and the motor travel region for switching between the engine 1 and the second motor generator MG2 as the vehicle start/travel-purpose (hereinafter referred to as travel-purpose) torque source, in other words, for switching between what is called engine travel, in which the vehicle travels on the engine 1 as the travel-purpose torque source, and what is called motor travel, in which the vehicle travels on the second motor generator MG2 as the travel-purpose torque source. The torque selecting map shown in FIG. 4 is made up of two-dimensional coordinates with the vehicle speed V and the accelerator opening degree $A_{cc}$ as parameters, and is stored in advance in the ROM of the ECU 100.

Referring to the torque selecting map shown in FIG. 4, the ECU 100 makes a determination between the motor travel region and the engine travel region based on the vehicle state indicated by the vehicle speed V and the accelerator opening degree $A_{cc}$, and executes the motor travel or the engine travel. As clearly seen from FIG. 4, the motor travel is executed when the accelerator opening degree is comparatively low, that is, during low load time, which is when the engine efficiency is said to be generally poor as compared with the high torque region, or executed when the vehicle speed is comparatively low, that is, during low engine torque time.

During the motor travel, in order to inhibit pulling of the engine 1 at rest and improve the fuel efficiency, the number of engine revolutions is made zero or approximately zero by a differential effect of the power split mechanism 3.

For example, as indicated by the points b→a on the solid line B shown in FIG. 4, when the accelerator pedal is brought back in place and the accelerator opening degree $A_{cc}$ is reduced to change the vehicle state from the engine travel region to the motor travel region, fuel supply from the fuel injection device is stopped, that is, fuel is cut so as to stop the engine 1; thus, a switch is made from the engine travel to the motor travel. Here, the ECU 100 quickly decreases the rotation number of the rotor MG1R of the first motor generator MG1 so as to quickly decrease the number of engine revolutions to zero or approximately zero.

As indicated by the points a→b on the solid line B shown in FIG. 4, when the accelerator pedal is operated by being depressed and the accelerator opening degree $A_{cc}$ is increased to change the vehicle state from the motor travel region to the engine travel region, the first motor generator MG1 is electrified to increase the rotation number of the rotor MG1R, thereby making the first motor generator MG1 function as a starter. For example, the number of engine revolutions is increased to a number of revolutions at which the engine 1 is self-rotatable, and the engine 1 is started by fuel supply from the fuel injection device and ignition by the ignition device; thus, a switch is made from the motor travel to the engine travel.

As described above, even in the engine travel region, torque assist is possible in such a manner that electric energy is supplied from the battery 300 to the second motor generator MG2 to drive the second motor generator MG2 and aid the power of the engine 1. Thus, in this embodiment, travel of the vehicle with both the engine 1 and the second motor generator MG2 as the travel-purpose torque sources will be encompassed within the engine travel instead of the motor travel.

Also, irrespective of the rest state or the low vehicle speed state of the vehicle, the driving state of the engine 1 can be maintained by the electrical CVT function (differential effect) of the first motor generator MG1 and the power split mechanism 3. For example, when the residual charge amount, SOC, of the battery 300 reduces while the vehicle is at rest and when there is a need for power generation by the first motor generator MG1, then the rotation number of the first motor generator MG1 may be increased with the first motor generator MG1 in its power generating state by the power of the engine 1, and the rotation number of the second motor generator MG2 may be made zero (approximately zero) because of the vehicle rest state. Even in this case, the number of engine revolutions is maintained at a number of revolutions at which the engine 1 is self-rotatable by the differential effect of the power split mechanism 3.

Also, irrespective of whether the vehicle is at rest or traveling, the rotation number of the first motor generator MG1 and/or the rotation number of the second motor generator MG2 is controlled by the electrical CVT function of the first motor generator MG1 and the power split mechanism 3 so as to maintain the number of revolutions at any number of engine revolutions.

—Coupling Transmitted-Torque Control—

Next, coupling transmitted-torque control, which is characteristic control of this embodiment, will be described.

First, the outline of the coupling transmitted-torque control will be described. In the coupling transmitted-torque control, when the electronically controlled coupling 10 is in fastened state, that is, in four-wheel drive state, and when the engine 1 is started during EV travel (during EV-4WD travel), the engagement force (hereinafter occasionally referred to as fastening force) of the electronically controlled coupling 10 is controlled to the reduction side (to the side of releasing the electronically controlled coupling 10). That is, the electronically controlled coupling 10 is controlled to reduce the transmission amount of torque (coupling torque) occurring in conjunction with the start of the engine 1 to the side of the rear wheels 8L and 8R (the rear wheel-purpose differential device 73, the rear-wheel shaft 81, and the rear wheels 8L and 8R). That is, the transmission amount of torque to the side of the rear wheels 8L and 8R (driven wheel side) by the electronically controlled coupling 10 is reduced (which is an operation by torque transmission amount controlling means to reduce the transmission amount of torque to the side of the driven wheels).

Figure 5:
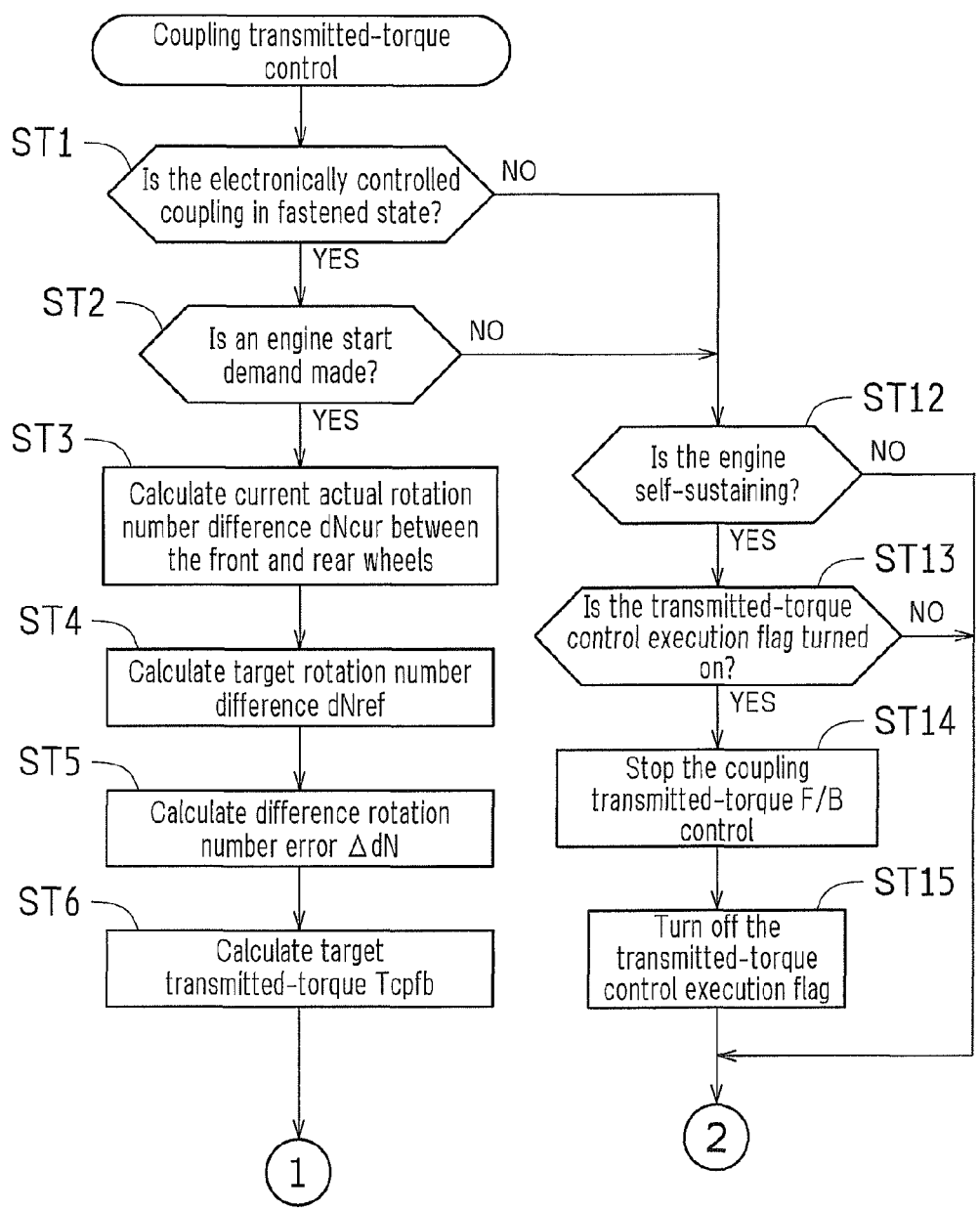
FIG. 5 is a flowchart of a first half of an operation procedure of coupling transmitted-torque control.
Figure 6:
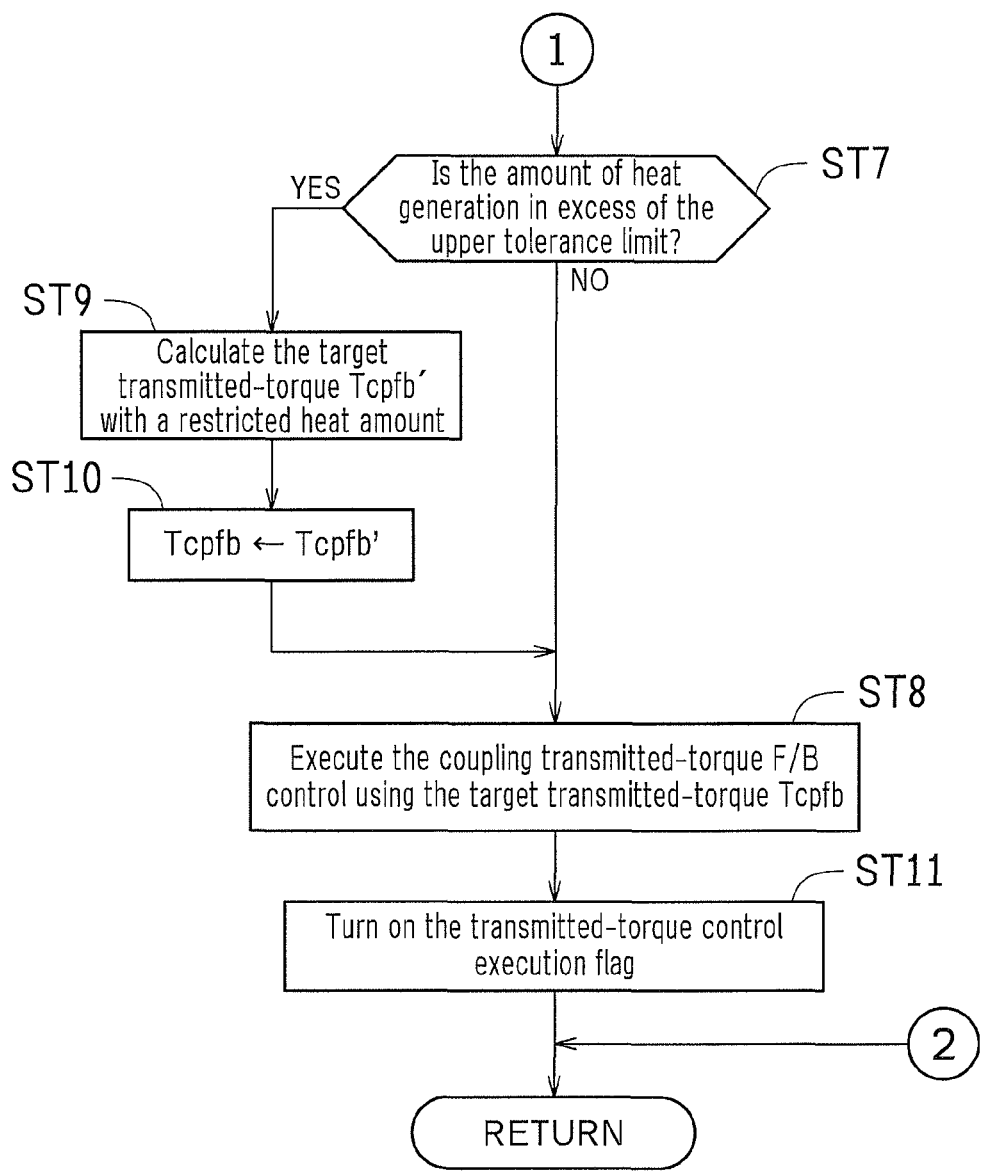
FIG. 6 is a flowchart of a second half of the operation procedure of the coupling transmitted-torque control.

A specific control procedure of the coupling transmitted-torque control will be described below. FIGS. 5 and 6 each are a flowchart of an operation procedure of the coupling transmitted-torque control. The flowcharts shown in FIGS. 5 and 6 are executed every few to several msec during EV travel of the vehicle.

First, at step ST1, whether the electronically controlled coupling 10 is in fastened state is determined. That is, whether the current travel state of the vehicle is EV-4WD travel is determined. For example, during EV travel of the vehicle, when one wheel among the four wheels 6L, 6R, 8L, and 8R slips and the rotation number of the wheel increases over the rotation number of the other wheels, or when the travel moves from a low-inclined road surface to a climbing road, then the exciting current $I_e$ to the electronically controlled coupling 10 increases to turn the electronically controlled coupling 10 into fastened state, resulting in a transition from the two-wheel drive state to the four-wheel drive state. In view of this, whether the electronically controlled coupling 10 is in fastened state is determined by, for example, monitoring the exciting current $I_e$. For example, when the exciting current $I_e$ is at a value in excess of 50% of the maximum value of control range of the exciting current $I_e$, a determination is made that the electronically controlled coupling 10 is in fastened state, that is, a YES determination is made at step ST1. This value should not be construed in a limiting sense and may be set in any convenient manner.

When the electronically controlled coupling 10 is not in fastened state and a NO determination is made at step ST1, the procedure moves to step ST12, where whether the engine 1 is self-sustaining is determined. Since the electronically controlled coupling 10 is currently not in fastened state (for example, EV-2WD travel state) and the engine 1 is at rest, a NO determination is made at step ST12 in this case and returned.

When the electronically controlled coupling 10 is in fastened state, that is, the current travel state of the vehicle is EV-4WD travel, and a YES determination is made at step ST1, then the procedure moves to step ST2, where whether an engine start demand is made is determined. For example, as indicated by the points a→b on the solid line B shown in FIG. 4, a determination is made as to whether an engine start demand has been made due to an increase in the demanded torque, which can be caused by, for example, an increase in the depression degree of the accelerator pedal (accelerator opening degree) by the driver.

When no engine start demand is made and a NO determination is made at step ST2, the procedure moves to step ST12, where whether the engine 1 is self-sustaining is determined. In this case, although the travel state is currently EV-4WD travel state, the engine 1 continues being in rest state, and therefore, a NO determination is made at step ST12 and returned.

When an engine start demand is made and a YES determination is made at step ST2, the procedure moves to step ST3, where a current actual rotation number difference $dN_{cur}$ between the front and rear wheels is calculated. Specifically, the actual rotation number difference $dN_{cur}$ between the front and rear wheels is calculated by calculating an average front-wheel actual rotation number $N_f$ between the rotation number of the right-front wheel 6R detected by the right-front wheel speed sensor 103 and the rotation number of the left-front wheel 6L detected by the left-front wheel speed sensor 104. Similarly, an average rear-wheel actual rotation number $N_r$ between the rotation number of the right-rear wheel 8R detected by the right-rear wheel speed sensor 105 and the rotation number of the left-rear wheel 8L detected by the left-rear wheel speed sensor 106 is calculated. Then, the rear-wheel actual rotation number $N_r$ is subtracted from the front-wheel actual rotation number $N_f$, thus the actual rotation number difference $dN_{cur}(=N_f-N_r)$ between the front and rear wheels is calculated.

Then, the procedure moves to step ST4, where a target rotation number difference $dN_{ref}$ is calculated. The target rotation number difference $dN_{ref}$ is an experimentally obtained value. The target rotation number difference $dN_{ref}$ will be described in detail below.

Assume that the engine 1 is started in EV-4WD travel state, in which the electronically controlled coupling 10 is in fastened state, in such a situation that the number of engine revolutions is comparatively low (for example, during the time from cranking to complete explosion). Here, in such a situation that the frequency of a change in torque transmitted toward the drive system on the side of the rear wheels 8R and 8L and the characteristic frequency of the drive system on the side of the rear wheels 8R and 8L agree, there is a possibility of vibration occurring at the drive system on the side of the rear wheels 8R and 8L due to a resonance phenomenon. The vibration propagates to the vehicle body, causing noise (muffled sound) in the vehicle interior.

The transmission amount of torque to the drive system on the side of the rear wheels 8R and 8L is reduced by turning the electronically controlled coupling 10 in fastened state into the release side. The transmission amount of torque to the drive system on the side of the rear wheels 8R and 8L is determined by an attenuation (attenuation of the transmitted torque) associated with turning the electronically controlled coupling 10 into the release side. The attenuation at the electronically controlled coupling 10 is correlated to the difference (differential rotation number) between the rotation number of the front wheels 6R and 6L and the rotation number of the rear wheels 8R and 8L. In view of this, in order to obtain an attenuation without occurrence of vibration at the drive system on the side of the rear wheels 8R and 8L due to a resonance phenomenon, the differential rotation number (the difference between the rotation number of the front wheels 6R and 6L and the rotation number of the rear wheels 8R and 8L) correlated to the attenuation is set in advance, and this differential rotation number is set as the target rotation number difference $dN_{ref}$. The correlation between the attenuation and the differential rotation number is determined by the type of the electronically controlled coupling 10. In view of this, a relationship between the attenuation and the differential rotation number may be obtained by an experiment or simulation, and the target rotation number difference $dN_{ref}$ may be set from the attenuation without occurrence of vibration due to a resonance phenomenon.

Figure 7:
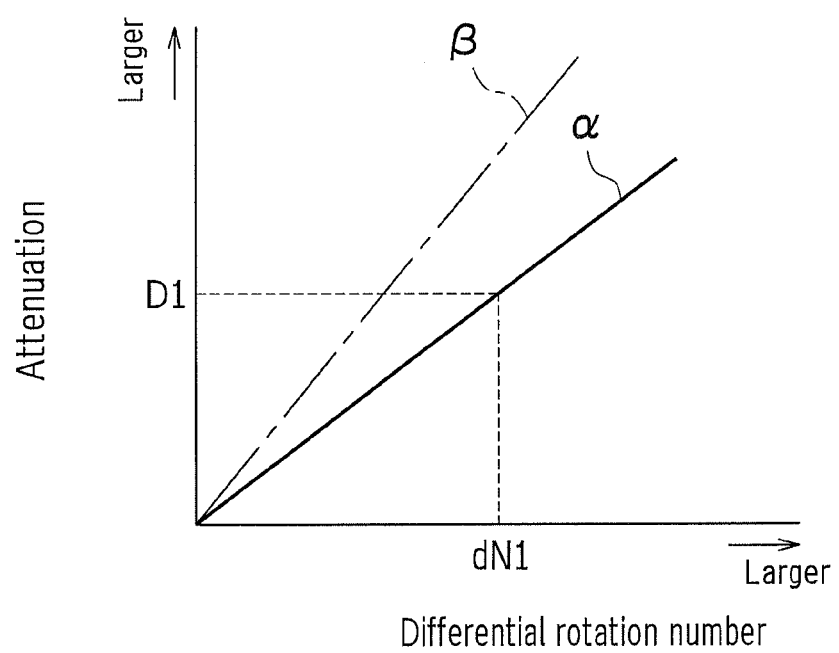
FIG. 7 is a graph illustrating a relationship between attenuation and differential rotation number at the electronically controlled coupling.

FIG. 7 illustrates a relationship between the attenuation and the differential rotation number. The solid line α and the dashed line β each indicate a relationship between the attenuation and the differential rotation number with a different type of electronically controlled coupling 10.

The attenuation without occurrence of vibration due to a resonance phenomenon may be equal to or more than a predetermined attenuation, which reduces the transmission amount of torque to the drive system on the side of the rear wheels 8R and 8L and ensures a situation where no vibration occurs due to a resonance phenomenon. That is, when the differential rotation number is equal to or more than a predetermined differential rotation number, a situation is ensured where no vibration occurs due to a resonance phenomenon. The target rotation number difference $dN_{ref}$ is set at a smallest differential rotation number within a range in which no vibration occurs due to a resonance phenomenon. That is, the target rotation number difference $dN_{ref}$ is set at a value of strongest engagement force of the electronically controlled coupling 10 within the range in which no vibration occurs due to a resonance phenomenon. For example, in the electronically controlled coupling 10 with the characteristics of the solid line α shown in FIG. 7, when an experiment or simulation reveals that a situation is ensured where no vibration occurs due to a resonance phenomenon when the differential rotation number is equal to or more than dN1 (with an attenuation of equal to or more than D1) in the drawing, this differential rotation number dN1 is set as the target rotation number difference $dN_{ref}(=dN1)$.

After the target rotation number difference $dN_{ref}$ is calculated in the above-described manner, the procedure moves to step ST5, where a difference rotation number error $\Delta dN$ is calculated by the following Formula (1).

$$\Delta dN = dNref - dNcur \quad (1)$$

After the difference rotation number error ΔdN is calculated in the above-described manner, the procedure moves to step ST6, where a target transmitted-torque $T_{cpfb}$ of the electronically controlled coupling 10 is calculated by the following Formula (2). That is, the target transmitted-torque $T_{cpfb}$ is calculated by a PID operation.

$$Tcpfb = Kp \times \Delta dN + Kd \times \frac{d(\Delta dN)}{dt} + Ki \times \int \Delta dN dt \quad (2)$$

In Formula (2), $K_p$, $K_d$, and $K_i$ denote feedback coefficients respectively in the proportional item, the differentiation item, and the integration item.

In Formula (2), as the difference rotation number error ΔdN calculated in Formula (1) increases, the target transmitted-torque $T_{cpfb}$ obtained is a smaller value. That is, as the error (ΔdN) of the actual rotation number difference $dN_{cur}$ relative to the target rotation number difference $dN_{ref}$ increases (in the situation where the transmission amount of torque to the drive system on the side of the rear wheels 8R and 8L is higher), the obtained target transmitted-torque $T_{cpfb}$ is a value at which the engagement force of the electronically controlled coupling 10 is reduced.

Then, the procedure moves to step ST7 (FIG. 6), where a determination is made as to whether the amount of heat generation in the case of controlling the electronically controlled coupling 10 to obtain the target transmitted-torque $T_{cpfb}$ calculated at step ST6 is in an excessive situation over an upper tolerance limit $Q_{up}$. This determination is as to whether the situation satisfies the following Formula (3). The upper tolerance limit $Q_{up}$ of the amount of heat generation is obtained in advance by an experiment or simulation.

$$Qup < Tcpfb \times \Delta dN \quad (3)$$

Then, when the amount of heat generation in the case of controlling the electronically controlled coupling 10 to obtain the above-described target transmitted-torque $T_{cpfb}$ is not in an excessive situation over the upper tolerance limit $Q_{up}$ and a NO determination is made at step ST7, then the procedure moves to step ST8, where coupling transmitted-torque F/B (feedback) control is executed using the target transmitted-torque $T_{cpfb}$ calculated at step ST6. That is, in order to obtain this target transmitted-torque $T_{cpfb}$, the exciting current $I_e$ to the electronically controlled coupling 10 is subjected to feedback control.

When the amount of heat generation in the case of controlling the electronically controlled coupling 10 to obtain the above-described target transmitted-torque $T_{cpfb}$ is in an excessive situation over the upper tolerance limit and a YES determination is made at step ST7, then the procedure moves to step ST9, where a target transmitted-torque $T_{cpfb}'$ with a restricted heat amount is calculated by the following Formula (4).

$$Tcpfb' = \frac{Qup}{\Delta dN} \quad (4)$$

Then, the procedure moves to step ST10, where the target transmitted-torque $T_{cpfb}'$ with a restricted heat amount calculated at step ST9 is set as the target transmitted-torque $T_{cpfb}$. Then at step ST8, the coupling transmitted-torque F/B control is executed using the target transmitted-torque $T_{cpfb}$ set at step ST10. That is, in order to obtain the target transmitted-torque $T_{cpfb}'$ with a restricted heat amount, the exciting current $I_e$ to the electronically controlled coupling 10 is subjected to feedback control.

After the exciting current $I_e$ to the electronically controlled coupling 10 is controlled to obtain the target transmitted-torque $T_{cpfb}$ in the above-described manner, the procedure moves to step ST11, where a transmitted-torque control execution flag stored in advance in the ECU 100 is turned on and returned. Here, the integration item in Formula (2) is reset.

Thus, the electronically controlled coupling 10 is controlled to obtain the target transmitted-torque $T_{cpfb}$ in the above-described manner. This reduces the engagement force of the electronically controlled coupling 10 (the electronically controlled coupling 10 controlled to the release side), and reduces the transmission amount of torque occurring in conjunction with start of the engine 1 (a variable torque in a comparatively low frequency) to the side of the rear wheels 8L and 8R (the rear wheel-purpose differential device 73, the rear-wheel shaft 81, and the rear wheels 8L and 8R). That is, the transmission amount of torque by the electronically controlled coupling 10 to the side of the rear wheels 8L and 8R (driven wheel side) is reduced. As a result, in a situation where the number of engine revolutions is comparatively low (for example, during the time from cranking to complete explosion), no agreement occurs between the frequency of a change in torque transmitted toward the drive system on the side of the rear wheels 8L and 8R and the resonance point of the drive system on the side of the rear wheels 8L and 8R. This inhibits occurrence of vibration at the drive system on the side of the rear wheels 8L and 8R. With vibration inhibited, the occurrence of noise (muffled sound) in the vehicle interior caused by propagation of the vibration to the vehicle body is also prevented.

With control of the electronically controlled coupling 10 started, the procedure returns to step ST1. In this case, the electronically controlled coupling 10 is not in fastened state, and therefore, a NO determination is made at step ST1 and the procedure moves to step ST12. At step ST12, whether the engine 1 is self-sustaining is determined, as described above. When the engine 1 is still cranking and not self-sustaining, a NO determination is made at step ST12 and returned. That is, the control of the electronically controlled coupling 10 to obtain the target transmitted-torque $T_{cpfb}$ continues, and the occurrence of the above-described vibration is inhibited.

When complete explosion takes place in the combustion chamber of the engine 1 and the number of engine revolutions increases to, for example, a predetermined idling revolution number, and when a determination is made that the engine 1 is self-sustaining (when a YES determination is made at step ST12), the procedure moves to step ST13, where whether the transmitted-torque control execution flag is turned on is determined. That is, whether the electronically controlled coupling 10 is currently being controlled to obtain the target transmitted-torque $T_{cpfb}$ is determined.

When the transmitted-torque control execution flag is off and a NO determination is made at step ST13, the above-described feedback control of the electronically controlled coupling 10 is determined as unexecuted and returned. When the transmitted-torque control execution flag is turned on and a YES determination is made at step ST13, the procedure moves to step ST14, where the above-described feedback control of the electronically controlled coupling 10 is stopped. That is, the electronically controlled coupling 10 is returned to fastened state. That is, a 4WD travel state corresponding to the current road surface situation and the like is employed (in this case, a 4WD travel state in engine driven state).

Then, the procedure moves to step ST15, where the transmitted-torque control execution flag is reset and turned off. The above-described operations are repeated.

Thus, in this embodiment, at the start time of the engine 1, the electronically controlled coupling 10 is controlled to reduce the transmission amount of torque to the drive system on the side of the rear wheels 8L and 8R, thereby making it difficult to transmit torque change to the drive system on the side of the rear wheels 8L and 8R. This inhibits vibration at the drive system on the side of the rear wheels 8L and 8R, and also inhibits noise (muffled sound) in the vehicle interior caused by the vibration.

Also in this embodiment, the target value of the transmission amount of torque to the drive system on the side of the rear wheels 8L and 8R at the start time of the engine 1 is set at a largest value (the target transmitted-torque $T_{cpfb}$) in a range in which vibration is inhibited at the drive system on the side of the rear wheels 8L and 8R. This ensures a transmission amount of torque to the drive system on the side of the rear wheels 8L and 8R while inhibiting vibration at the drive system on the side of the rear wheels 8L and 8R, thereby maintaining the travel performance of the vehicle (travel performance suitable for the road surface condition or other condition).

Additionally, the target transmitted-torque $T_{cpfb}$ is set at a value that does not exceed the upper limit value $Q_{up}$ of the tolerance amount of heat generation. This inhibits vibration at the drive system on the side of the rear wheels 8L and 8R while preventing overheating of the electronically controlled coupling 10.

Embodiment 2

Next, embodiment 2 will be described. In embodiment 1, a hybrid vehicle employing the standby four-wheel drive system based on FF layout is exemplified and described. In this embodiment, a hybrid vehicle employing the standby four-wheel drive system based on FR layout will be described.

Figure 8:
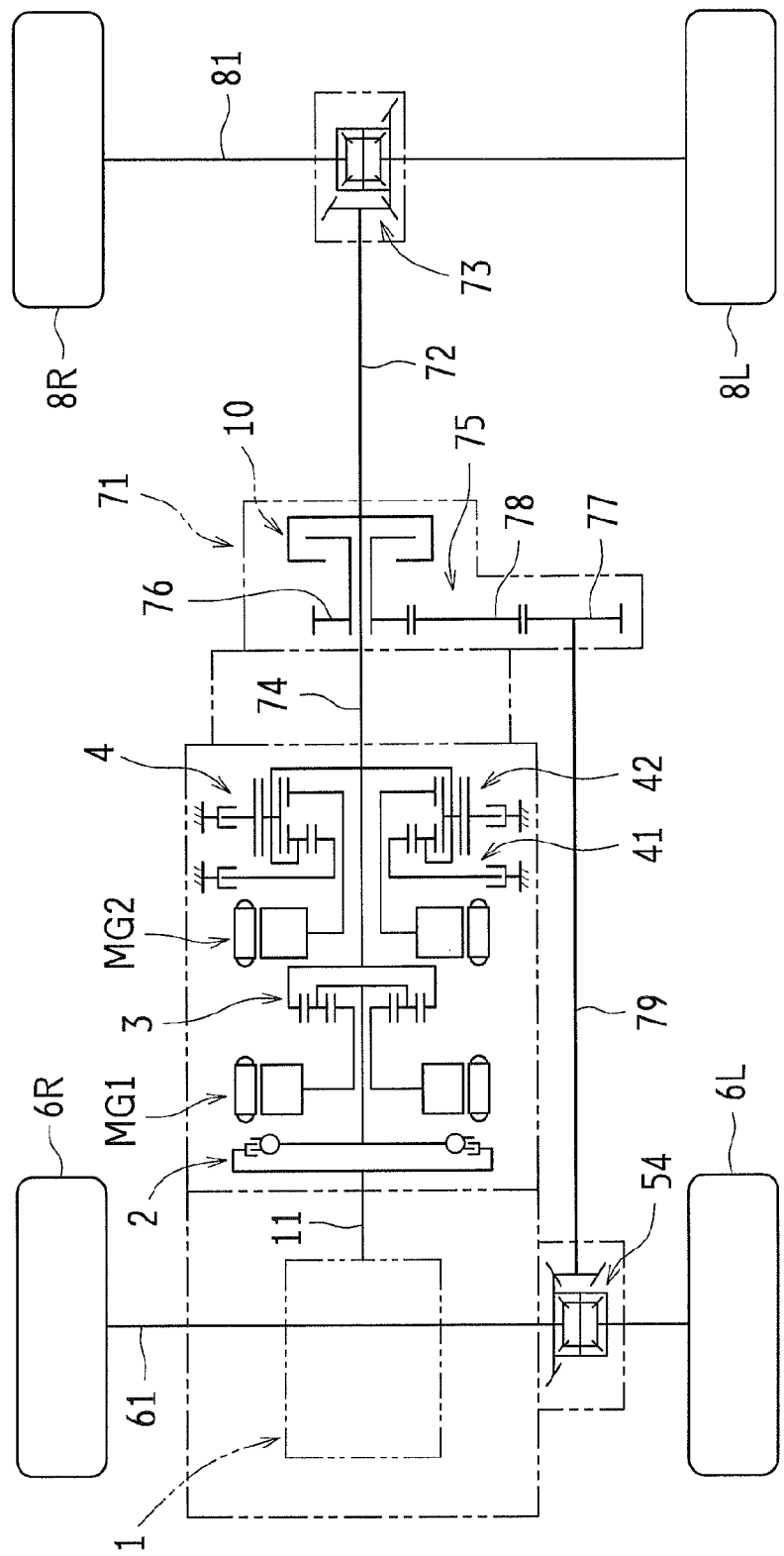
FIG. 8 is a diagram schematically illustrating a configuration of a vehicle according to embodiment 2.
Figure 9:
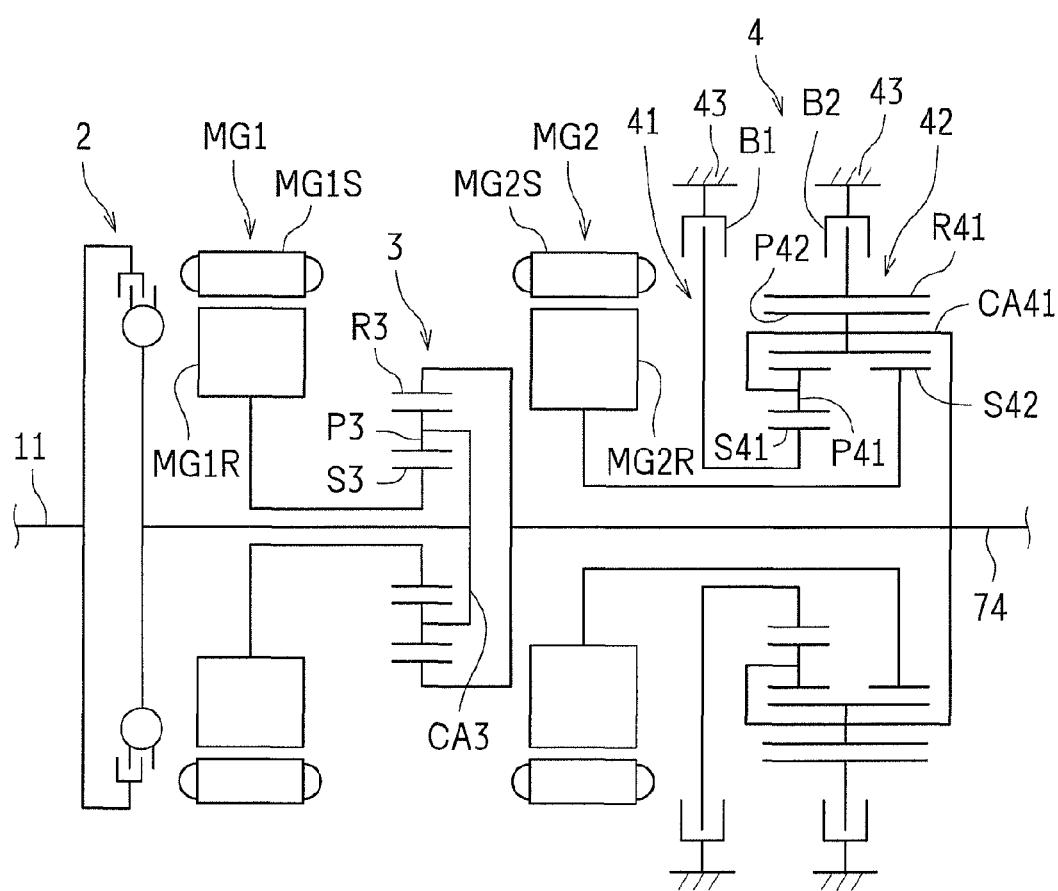
FIG. 9 is a skeleton diagram schematically illustrating a configuration of a power split mechanism and a reduction mechanism of the vehicle shown in FIG. 8.

FIG. 8 is a diagram schematically illustrating a vehicle according to this embodiment, and FIG. 9 is a skeleton diagram schematically illustrating a configuration of the power split mechanism 3 and the reduction mechanism 4. In the embodiment of FIGS. 8 and 9 and embodiment 1, the same elements and those having the same functions are designated reference numerals, and will not be elaborated here. The following description only deals with different respects from embodiment 1.

As shown in FIGS. 8 and 9, in the power split mechanism 3, a power transmission shaft 74 is coupled to the ring gear R3 (see FIG. 9). The power transmission shaft 74 is coupled to the rear propeller shaft 72.

As shown in FIG. 9, the reduction mechanism 4 includes, as its main component, a Ravigneaux planetary gear mechanism in which a double-pinion planetary gear mechanism 41 is combined with a single-pinion planetary gear mechanism 42 with a common planetary carrier and a common ring gear. Specifically, the reduction mechanism 4 includes a first sun gear S41 and a second sun gear S42, and the first sun gear S41 meshes with a short pinion gear P41. The short pinion gear P41 meshes with a long pinion gear P42.

The long pinion gear P42 meshes with the ring gear R41, which is concentric to the first sun gear S41 and the second sun gear S42. The short pinion gear P41 and the long pinion gear P42 are held by a common planetary carrier CA41 in such a manner that the short pinion gear P41 and the long pinion gear P42 each are able to rotate themselves and revolve. The planetary carrier CA41 is coupled to the power transmission shaft 74. Further, the second sun gear S42 meshes with the long pinion gear P42, and the second sun gear S42 is coupled to the rotor MG2R of the second motor generator MG2.

The first sun gear S41 and the ring gear R41 constitute the double-pinion planetary gear mechanism 41 together with the short pinion gear P41 and the long pinion gear P42. The second sun gear S42 and the ring gear R41 constitute the single-pinion planetary gear mechanism 42 together with the long pinion gear P42.

Further, the reduction mechanism 4 is provided with a first brake B1 that selectively secures the first sun gear S41 to a housing (non-rotating member) 43, and a second brake B2 that selectively secures the ring gear R41 to the housing (non-rotating member) 43. These brakes B1 and B2 are, for example, hydraulic-pressure frictional engagement elements of multi-disc type or band type that effect engagement force by hydraulic pressure of operating oil. The brakes B1 and B2 have their torque capacity sequentially varied in accordance with engagement pressure generated by a hydraulic pressure actuator or the like.

In the reduction mechanism 4 of such structure, releasing both the brakes B1 and B2 results in neutral state. Releasing the brake B1 while making the brake B2 engaged fixes the rotation of the ring gear R41. The ring gear R41 with fixed rotation and the second sun gear S42, which rotates by the second motor generator MG2, implement a state in which the planetary carrier CA41, that is, the power transmission shaft 74 (the rear propeller shaft 72) makes low-speed rotation (Lo gear position). Releasing the brake B2 while making the brake B1 engaged fixes the rotation of the first sun gear S41. The sun gear S41 with fixed rotation and the second sun gear S42 (the ring gear R41), which rotates by the second motor generator MG2, implement a state in which the planetary carrier CA41, that is, the power transmission shaft 74 (the rear propeller shaft 72) makes high-speed rotation (Hi gear position).

As shown in FIG. 8, the transfer 71 includes the electronically controlled coupling 10 and a counter gear unit 75. The counter gear unit 75 is made up of a counter drive gear 76, a counter driven gear 77, and an intermediate gear 78.

The electronically controlled coupling 10 has its input side coupled to the power transmission shaft 74 (the rear propeller shaft 72). The electronically controlled coupling 10 has its output side coupled to the counter drive gear 76, and the counter drive gear 76 meshes with the intermediate gear 78. The intermediate gear 78 meshes with the counter driven gear 77, and the counter driven gear 77 is coupled to a front propeller shaft 79. The front propeller shaft 79 is coupled to the left-right front wheels (driven wheels) 6L and 6R through the front wheel-purpose differential device 54 and the front-wheel shaft 61.

The electronically controlled coupling 10 selectively couples the power transmission shaft 74 (the rear propeller shaft 72) and the counter drive gear 76 so as to selectively switch between the two-wheel drive state on the rear wheels (main driving wheels) 8L and 8R and the four-wheel drive state on the rear wheels (main driving wheels) 8L and 8R and the front wheels (driven wheels) 6L and 6R.

Other configurations and the coupling transmitted-torque control are similar to embodiment 1.

Executing the coupling transmitted-torque control according to embodiment 1 with respect to the hybrid vehicle employing the standby four-wheel drive system based on FR layout configured in the above-described manner inhibits vibration at the drive system on the side of the front wheels 6L and 6R at the start time of the engine 1, and also inhibits noise (muffled sound) in the vehicle interior caused by the vibration.

Other Embodiments

The above-described embodiments employ a pilot-clutch electronically controlled coupling 10. This, however, should not be construed as limiting the present invention, and a clutch direct-pressing electronically controlled coupling may be used. Further, these electronically controlled couplings 10 should not be construed in a limiting sense. Any other type of torque distributor may be used insofar as the device is capable of changing the distribution ratio between the front and rear wheels. It should be noted, however, that high responsivity is required in switching between transmission and non-transmission of torque.

While in the above-described embodiments the present invention is applied to a standby four-wheel drive vehicle equipped with the transfer 71, which includes a counter gear, this should not be construed as limiting the embodiment of the transfer. For example, the transfer may include a mechanism that couples a sprocket on the main drive wheel side to a sprocket on the driven wheel side using a chain.

While in the above-described embodiments the present invention is applied to a hybrid standby four-wheel drive vehicle equipped with two motors (the motor generators MG1 and MG2), this should not be construed as limiting the present invention. The present invention may also be applied to a hybrid standby four-wheel drive vehicle equipped with a single motor.

In the above-described embodiments, a PID operation is used as the method of calculating the target transmitted-torque $T_{cpfb}$. This, however, should not be construed as limiting the present invention. For example, one or two of proportional operation, differentiation operation, and integration operation may be used to calculate the target transmitted-torque $T_{cpfb}$.

INDUSTRIAL APPLICABILITY

The present invention finds applications in control of a vehicle that is selectively switchable between the two-wheel drive state, in which the vehicle is driven either on the front wheels or the rear wheels, and the four-wheel drive state, in which the vehicle is driven on both the front wheels and the rear wheels.

DESCRIPTION OF THE REFERENCE NUMERAL

1 Engine (internal combustion engine)
6L, 6R Front wheel (main drive wheel)
8L, 8R Rear wheel (driven wheel)
10 Electronically controlled coupling (torque distributor)
100 ECU
103 Right-front wheel speed sensor
104 Left-front wheel speed sensor
105 Right-rear wheel speed sensor
106 Left-rear wheel speed sensor
MG1 First motor generator
MG2 Second motor generator (motor)

The invention claimed is:

1. A control device of a hybrid vehicle, the hybrid vehicle comprising an internal combustion engine and a motor as travel-purpose torque sources, and a torque distributor configured to change a distribution ratio of torque from the travel-purpose torque sources to main driving wheels and driven wheels so as to render variable a transmission amount of the torque to a side of the driven wheels,
wherein the control device comprises torque a transmission amount controlling section that controls the torque distributor to reduce the transmission amount of the torque to the side of the driven wheels when the internal combustion engine is started in such a travel state that the torque from the motor alone is used as travel-purpose torque and that the torque is distributed by the torque distributor to the main driving wheels and the driven wheels.

2. The control device of a vehicle according to claim 1, wherein the torque transmission amount controlling section is configured to control the torque distributor to reduce the transmission amount of the torque to the side of the driven wheels only for a period of time between a start demand time of the internal combustion engine and a time when the internal combustion engine reaches a number of revolutions at which the internal combustion engine is self-sustainable.

3. The control device of a vehicle according to claim 1, wherein the torque transmission amount controlling section is configured to control the torque distributor so as to match an actual rotation number difference with a target rotation number difference set in advance, the actual rotation number difference being a rotation difference between an actual number of rotations of the main driving wheels and an actual number of rotations of the driven wheels.

4. The control device of a vehicle according to claim 1, wherein the transmission amount of the torque to the side of the driven wheels at the start time of the internal combustion engine has a target value set at a largest value in a range in which a vibration at the side of the driven wheels due to a change in the torque generated by the internal combustion engine is inhibited.

5. The control device of a vehicle according to claim 4, wherein when an amount of heat generation at the torque distributor exceeds an upper limit value of a tolerance amount of heat generation set in advance, the target value of the transmission amount of the torque to the side of the driven wheels is limited to a value that does not exceed the upper limit value of the tolerance amount of heat generation.

6. The control device of a vehicle according to claim 1, wherein the vehicle is in a standby four-wheel drive system based on front engine, front-wheel-drive layout.

* * * * *